US008554915B2

(12) United States Patent
Famolari et al.

(10) Patent No.: US 8,554,915 B2
(45) Date of Patent: Oct. 8, 2013

(54) MANAGEMENT OF COMMUNICATION AMONG NETWORK DEVICES HAVING MULTIPLE INTERFACES

(75) Inventors: David Famolari, Montclair, NJ (US); Nobuyasu Nakajima, Wayne, NJ (US)

(73) Assignees: Telcordia Technologies Inc., Piscataway, NJ (US); Toshiba America Research, Inc., Piscataway, NJ (US)

( * ) Notice: Subject to any disclaimer, the term of this patent is extended or adjusted under 35 U.S.C. 154(b) by 1940 days.

(21) Appl. No.: 10/144,717

(22) Filed: May 15, 2002

(65) Prior Publication Data
US 2003/0217179 A1 Nov. 20, 2003

(51) Int. Cl.
*G06F 15/173* (2006.01)

(52) U.S. Cl.
USPC .......................................................... 709/226

(58) Field of Classification Search
USPC .................................................. 709/223–226
See application file for complete search history.

(56) References Cited

U.S. PATENT DOCUMENTS

| | | | | |
|---|---|---|---|---|
| 6,058,106 | A * | 5/2000 | Cudak et al. .................. | 709/243 |
| 6,275,707 | B1 * | 8/2001 | Reed et al. ................. | 455/456.3 |
| 6,326,926 | B1 * | 12/2001 | Shoobridge et al. ....... | 455/432.1 |
| 6,560,443 | B1 * | 5/2003 | Vaisanen et al. ................ | 455/73 |
| 6,690,918 | B2 * | 2/2004 | Evans et al. .................. | 455/41.2 |
| 6,704,293 | B1 * | 3/2004 | Larsson et al. ................ | 370/255 |
| 6,754,469 | B1 * | 6/2004 | Lee et al. ...................... | 455/41.2 |
| 6,912,373 | B2 * | 6/2005 | Lee .............................. | 455/41.2 |
| 2001/0034224 | A1 * | 10/2001 | McDowell et al. ........... | 455/412 |
| 2001/0041594 | A1 * | 11/2001 | Arazi et al. .................... | 455/561 |
| 2001/0053134 | A1 * | 12/2001 | Fillebrown et al. ........... | 370/329 |
| 2002/0034263 | A1 * | 3/2002 | Schmidl et al. ............... | 375/299 |
| 2002/0035699 | A1 * | 3/2002 | Crosbie ........................ | 709/229 |
| 2002/0039357 | A1 * | 4/2002 | Lipasti et al. ................. | 370/338 |
| 2002/0045424 | A1 * | 4/2002 | Lee ................................ | 455/41 |
| 2002/0058504 | A1 * | 5/2002 | Stanforth ..................... | 455/426 |
| 2002/0061009 | A1 * | 5/2002 | Sorensen ..................... | 370/351 |
| 2002/0061744 | A1 * | 5/2002 | Hamalainen et al. ........ | 455/426 |
| 2002/0066018 | A1 * | 5/2002 | Linnartz ....................... | 713/171 |
| 2002/0085719 | A1 * | 7/2002 | Crosbie ........................ | 380/248 |
| 2002/0089963 | A1 * | 7/2002 | Kang et al. ................... | 370/340 |
| 2002/0090911 | A1 * | 7/2002 | Evans et al. .................... | 455/41 |
| 2002/0101848 | A1 * | 8/2002 | Lee et al. ...................... | 370/349 |
| 2002/0129166 | A1 * | 9/2002 | Baxter et al. ................. | 709/246 |
| 2002/0143855 | A1 * | 10/2002 | Traversat et al. ............ | 709/202 |
| 2002/0161885 | A1 * | 10/2002 | Childers et al. .............. | 709/224 |
| 2002/0169886 | A1 * | 11/2002 | Saito et al. ................... | 709/230 |
| 2002/0174223 | A1 * | 11/2002 | Childers et al. .............. | 709/224 |
| 2002/0184418 | A1 * | 12/2002 | Blight .......................... | 710/100 |

(Continued)

OTHER PUBLICATIONS

Enhancing Performance of Asynchronous Data Traffic over the Bluetooth Wireless Ad-hoc Network, Abhishek Das, Abhishek Ghose, Ashu Razdan, Huzur Sarany & Rajeev Shorey, 2001 IEEE.*

(Continued)

*Primary Examiner* — Christopher Biagini
(74) *Attorney, Agent, or Firm* — Banner & Witcoff, Ltd.

(57) ABSTRACT

A network element or server that manages name, address and identifying information of network devices that contain at least one Bluetooth interface is described. A Bluetooth Device Address may be queried by a first network device of a second network device to the server and the server may provide additional name, address and identifying information on the queried second network device to the first network device such that the first network device may establish a preferred connection with the second network device.

36 Claims, 12 Drawing Sheets

(56) References Cited

U.S. PATENT DOCUMENTS

| | | | |
|---|---|---|---|
| 2002/0196771 A1* | 12/2002 | Vij et al. ........................ | 370/349 |
| 2003/0021250 A1* | 1/2003 | Willins et al. ................. | 370/338 |
| 2003/0026222 A1* | 2/2003 | Kotzin ........................... | 370/335 |
| 2003/0036350 A1* | 2/2003 | Jonsson et al. .................. | 455/41 |
| 2003/0046413 A1* | 3/2003 | Sakakura ....................... | 709/229 |
| 2003/0087629 A1* | 5/2003 | Juitt et al. ..................... | 455/411 |
| 2003/0093187 A1* | 5/2003 | Walker ............................. | 701/1 |
| 2003/0108062 A1* | 6/2003 | Agrawal et al. .............. | 370/463 |
| 2003/0119538 A1* | 6/2003 | Momosaki et al. ........... | 455/517 |
| 2003/0126213 A1* | 7/2003 | Betzler .......................... | 709/206 |
| 2003/0140344 A1* | 7/2003 | Bhatti ............................ | 725/62 |
| 2003/0147424 A1* | 8/2003 | Famolari ....................... | 370/503 |
| 2003/0217179 A1* | 11/2003 | Famolari et al. ............. | 709/245 |
| 2004/0014423 A1* | 1/2004 | Croome et al. .............. | 455/41.2 |
| 2004/0022219 A1* | 2/2004 | Mangold et al. ............. | 370/336 |
| 2004/0111494 A1* | 6/2004 | Kostic et al. .................. | 709/220 |
| 2004/0128509 A1* | 7/2004 | Gehrmann ..................... | 713/171 |
| 2004/0153520 A1* | 8/2004 | Rune et al. .................... | 709/206 |
| 2004/0162804 A1* | 8/2004 | Strittmatter et al. .............. | 707/1 |
| 2004/0260760 A1* | 12/2004 | Curnyn ......................... | 709/201 |
| 2005/0048972 A1* | 3/2005 | Dorenbosch et al. ......... | 455/436 |
| 2005/0080884 A1* | 4/2005 | Siorpaes et al. .............. | 709/223 |
| 2005/0088980 A1* | 4/2005 | Olkkonen et al. ............ | 370/255 |
| 2005/0096084 A1* | 5/2005 | Pohja et al. ................. | 455/556.1 |
| 2005/0097356 A1* | 5/2005 | Zilliacus et al. .............. | 713/201 |
| 2005/0107038 A1* | 5/2005 | Coutts ........................... | 455/41.2 |
| 2005/0181785 A1* | 8/2005 | Chen et al. .................... | 455/428 |
| 2005/0204025 A1* | 9/2005 | Haparnas ...................... | 709/223 |
| 2005/0267965 A1* | 12/2005 | Heller ............................ | 709/224 |

OTHER PUBLICATIONS

Bluetooth Security, Juha T. Vainio, May 25, 2000.*
A Bluetooth Scatternet Formation Algorithm, Ching Law and Kai-Yeung Siu, Massachusetts Institute of Technology, 2001, IEEE.*
Bluetooth.com/org website, Mar. 1, 2006.*
Jonvik, T., Engelstad, P., Tanh, D.: Ad-hoc formation of Bluetooth piconet and IP allocation in PAN, Proceedings of 5th International Symposium on Wireless Personal Multimedia Communications,vol. 2, Oct. 2002, pp. 489-493.*
Kuijpers G. et al., Bluetooth implementation in the WING-IP simulator, Personal, Indoor and Mobile Radio Communications, 2002, TI International Symposium on, Sep. 15-18, 2002, pp. 1247-1251.*
Johansson, P.; Kazantzidis, M.; Kapoor, R.; Gerla, M., "Bluetooth: an enabler for personal area networking," Network, IEEE , vol. 15, No. 5, pp. 28-37, Sep./Oct. 2001.*
"IrDA Interoperability," *Bluetooth Specifications*, http://www.bluetooth.org/spec, Feb. 22, 2001, pp. 425-442.
"Telephony Control Protocol Specification—TCS Binary," *Bluetooth Specifications*, http://www.bluetooth.org/spec, Feb. 22, 2001, pp. 443-510.
"Interoperability Requirements for Bluetooth as a WAP Bearer—PPP Adaptation," *Bluetooth Specifications*, http://www.bluetooth.org/spec, Feb. 22, 2001, pp. 511-534.
"Specification of the Bluetooth System: Host Controller Interface [Transport Layer]," *Bluetooth Specifications*, http://www.bluetooth.org/spec, Jan. 1, 2006, pp. 1-76.
"HCI UART Transport Layer: An Addendum to the HCI Document," *Bluetooth Specifications*, http://www.bluetooth.org/spec, Feb. 22, 2001, pp. 819-826.
"HCI USB Transport Layer—An Addendum to the HCI Document," *Bluetooth Specifications*, http://www.bluetooth.org/spec, Feb. 22, 2001, pp. 781-796.
"Specification of the Bluetooth System: Core & Profiles," *Bluetooth Specifications*, http://www.bluetooth.org/spec, Aug. 25, 2003, pp. 1-67.
"Service Discovery Application Profile," *Bluetooth Specifications*, http://www.bluetooth.org/spec, Feb. 22, 2001, pp. 63-98.
"Cordless Telephony Profile," *Bluetooth Specifications*, http://www.bluetooth.org/spec, Feb. 22, 2001, pp. 99-144.
"Intercom Profile," *Bluetooth Specifications*, http://www.bluetooth.org/spec, Feb. 22, 2001, pp. 145-170.
"Serial Port Profile," *Bluetooth Specifications*, http://www.bluetooth.org/spec, Feb. 22, 2001, pp. 171-196.
"Headset Profile," *Bluetooth Specifications*, http://www.bluetooth.org/spec, Feb. 22, 2001, pp. 197-226.
"Dial-Up Networking Profile," *Bluetooth Specifications*, http://www.bluetooth.org/spec, Feb. 22, 2001, pp. 227-250.
"Fax Profile," *Bluetooth Specifications*, http://www.bluetooth.org/spec, Feb. 22, 2001, pp. 251-272.
"Object Push Profile," *Bluetooth Specifications*, http://www.bluetooth.org/spec, Feb. 22, 2001, pp. 339-364.
"File Transfer Profile," *Bluetooth Specifications*, http://www.bluetooth.org/spec, Feb. 22, 2001, pp. 365-396.
"Synchronization Profile," Bluetooth Specifications, http://www.bluetooth.org/spec, Feb. 22, 2001, pp. 397-422.
"Specification of the Bluetooth System: Master Table of Contents & Compliance Requirements," Bluetooth Specifications, http://www.bluetooth.org/spec, Nov. 5, 2003, 1200 pages.
"Specification of the Bluetooth System: Master Table of Contents & Compliance Requirements," Covered Core Package version 2.0 + EDR, Bluetooth Specifications, http://www.bluetooth.org/spec, Nov. 4, 2004, 1250 pages.
Advanced Audio Distribution Profile Specification, Bluetooth Specification, Adopted V. 1.0, May 22, 2003, pp. 1-75.
Advanced Audio Distribution Profile Specification, Bluetooth Specification, Draft Rev. D12r04, Nov. 30, 2005, pp. 1-75.
Audio/Video Control Transport Protocol Specification, Bluetooth Specification, Version 1.0 Adopted, May 22, 2003, pp. 1-40.
Audio/Video Control Transport Protocol Specification, Bluetooth Specification, Draft Rev. D12r04, Nov. 30, 2005, 38 pages.
Audio/Video Control Distribution Transport Protocol Specification, Bluetooth Specification, Version 1.0 Adopted, May 22, 2003, pp. 1-145.
Audio/Video Control Distribution Transport Protocol Specification, Bluetooth Specification, Draft Rev. D12r04, Nov. 30, 2005, 144 pages.
Audio/Video Remote Control Profile, Bluetooth Specification, Version 1.0 Adopted, May 22, 2003, pp. 1-52.
Audio/Video Remote Control Profile, Bluetooth Specification, Draft Rev. D12r03, Nov. 10, 2005, 51 pages.
Basic Imaging Profile, Interoperability Specification, Bluetooth Specification, Jul. 25, 2003, pp. 1-99.
Specification Documents, Specification—Qualification and Testing, https://www.bluetooth.org/spec/, printed Jul. 7, 2006, 4 pages.
Bluetooth Network Encapsulation Protocol (BNEP) Specification, Bluetooth Specification, V. 1.0, Feb. 14, 2003, pp. 1-55.
Basic Printing Profile, Bluetooth Specification, V. 10r00, Feb. 10, 2005, pp. 1-134.
Basic Printing Profile, Bluetooth Specification, V. 12r00 Adopted, Apr. 27, 2006, pp. 1-127.
Basic Printing Profile, Interoperability Specification, Bluetooth Specification, Draft Rev. 0.95a, Oct. 5, 2001, pp. 1-131.
Common ISDN Access Profile, Bluetooth Specification, Draft Rev. 1.0b1, Nov. 16, 2002, pp. 1-30.
Device Identification Specification, Bluetooth Specification, V. 12r00 Adopted, Apr. 27, 2006, pp. 1-20.
Bluetooth Human Interface Device (HID) Profile v. 1.0 Erratum 747, Bluetooth Specification, Erratum 747 V10r00, Nov. 25, 2005, pp. 1-9.
Bluetooth ESDP for UPnP, Bluetooth Specification, Draft Rev. 0.95a, Jan. 31, 2001, pp. 1-59.
Core and Profiles, Bluetooth Specification, Adopted Errata V10r00, Jun. 11, 2005, 67 pages.
Generic Audio/Video Distribution Profile, Bluetooth Specification, Version 1.0 Adopted, May 22, 2003, pp. 1-35.
Generic Audio/Video Distribution Profile, Bluetooth Specification, Draft Rev. D12r04, Nov. 30, 2005, 33 pages.
Generic Object Exchange Profile, Part K:10, Bluetooth Specification V. 1.1, Feb. 7, 2005, pp. 310-338.
Guard Time Measurement, White Paper, Bluetooth Specifications, V10r00, Nov. 4, 2004, pp. 1-6.
HCI SD Transport Layer an Addendum to the HCI Document, Bluetooth Specification, V10r00, May 27, 2004, pp. 1-12.

HCI Three-Wire Uart Transport Layer an Addendum to the HCI Document, Bluetooth Specification, V0.95, Jan. 22, 2004, pp. 1-22.
Hardcopy Cable Replacement Profile, Interoperability Specification, Bluetooth Specification, V 1.0a, Sep. 23, 2002, pp. 1-56.
Hardcopy Cable Replacement Profile, Bluetooth Specification, V 12r00 Adopted, Apr. 27, 2006, pp. 1-51.
Hands-Free Profile, Bluetooth Specification, V 1.0 Adopted, Apr. 29, 2003, pp. 1-73.
Hands-Free Profile 1.5, Bluetooth Specification, V 10r00 Adopted, Nov. 25, 2005, pp. 1-93.
Human Interface Device (HID) Profile, Bluetooth Specification, V 1.0 Adopted, May 22, 2003, pp. 1-123.
Personal Area Networking Profile, Bluetooth Specification, V 1.0, Feb. 14, 2003, pp. 1-65.
Phone Book Access Profile, Bluetooth Specification, V 10r00 Adopted, Apr. 27, 2006, pp. 1-41.
RFCOMM with TS 07.10, Serial Port Emulation, Part F:1, Bluetooth Specification V. 1.1, Jun. 5, 2003, pp. 394-424.
SIM Access Profile, Interoperability Specification, Bluetooth Specification, V 10r00, May 12, 2005, pp. I-56.
SIM Access Profile, Interoperability Specification, Bluetooth Specification, V 0.95c, Aug. 10, 2002, pp. 1-50.
Serial Port Profile, Bluetooth Specification, Draft Rev. D12r05, Dec. 19, 2005, pp. 1-25.
Profile ICS Proforma for Unrestricted Digital Information Profile, Bluetooth Specification, Rev D09r02, Dec. 11, 2004, pp. 1-16.
Unrestricted Digital Information Profile, Prototyping Specification, Bluetooth Specification, Rev D09r02, Dec. 11, 2004, pp. 1-31.
Unrestricted Digital Information Profile, Bluetooth Specification, Rev D10r02, Jun. 13, 2005, pp. 1-30.
Test Case Reference List for the Bluetooth Qualification Program (profile parts), Release Dec. 11, 2004, 2 pages.
Test Suite Structure (TSS) and Test Purposes (TP) for Unrestricted Digital Information Profile, Bluetooth Specification, V D09r02, Dec. 14, 2004, pp. 1-29.
Video Conferencing Profile, Bluetooth Specification, V 0.95c, Sep. 23, 2002, pp. 1-43.
Video Distribution Profile, Bluetooth Specification, V10r00, Sep. 8, 2004, pp. 1-40.
Test Suite Structure (TSS) and Test Purposes (TP) for the WAP over Bluetooth Profile, Profile Test Specification, Bluetooth Specifications, Draft 0.7rc1, Jun. 26, 2003, pp. 1-45.
WAP over Bluetooth Profile, Bluetooth Specifications, Rev 0.9rc1, copyright 2003, pp. 1-44.

* cited by examiner

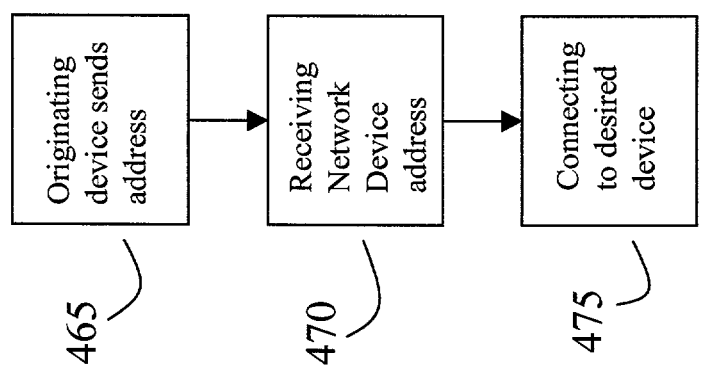

MANAGEMENT OF COMMUNICATION AMONG NETWORK DEVICES HAVING MULTIPLE INTERFACES

FIELD OF THE INVENTION

The present invention relates to management of communication among network devices and, in particular, management of devices containing a Bluetooth interface through a network storage device.

BACKGROUND OF THE INVENTION

Presently, portable transceivers of many types including cellular telephones, PCs, laptops, cordless phones, headsets, printers, PDAs, etc., are incorporated into wireless networks. These portable transceivers, such as Bluetooth devices, may contain digital devices to secure fast wireless transmissions of voice or data with worldwide compatibility. As a specification for a small-form factor, low-cost radio solution Bluetooth products, for example, may provide links between mobile computers, mobile phones and other portable handheld devices, and connectivity to the Internet. "Bluetooth" refers to a specification to standardize wireless transmission between a wide variety of devices such as PCs, cordless telephones, headsets, printers, PDAs, etc. Bluetooth creates a single digital wireless protocol to address end-user problems arising from the proliferation of various mobile devices that need to keep data synchronized and consistent from one device to another thereby allowing equipment from different vendors to work seamlessly together using Bluetooth as a "virtual cable".

Bluetooth devices may be named according to a common naming concept. For example, a Bluetooth device may possess a Bluetooth Device Name (BDN) or a name associated with a unique Bluetooth Device Address (BDA). Bluetooth devices may participate in an Internet Protocol (IP) network as well. If a Bluetooth device functions on an IP network, it may be provided with an IP address and an IP (network) name. Thus, a Bluetooth Device configured to participate on an IP network may contain a BDN, a BDA, an IP address and an IP name. The term "IP name" refers to a name corresponding to an IP address of an interface.

802.11 (i.e., IEEE 802.11) is an alternative IEEE standard for wireless LANS and devices. Using 802.11, for example, wireless networking may be accomplished with a single base station supporting several devices without cables. Devices may come pre-equipped with wireless hardware or a user may install a separate piece of hardware, such as a card, that may function as an antenna.

In addition, Multiple Interface Devices (MIDs) may be utilized in such wireless networks. MIDs may contain two independent network interfaces including a Bluetooth interface and an 802.11 interface thus allowing the MID to participate on two separate networks as well as interface with Bluetooth devices. The MID may have an IP address and a common IP (network) name associated with the IP address.

Many networks lack an adequate means for efficiently maintaining address information on the various devices, or for providing communications between devices that use incompatible communications protocol. For example, higher data transmission rates might be achieved in an 802.11 network but a participating MID might first need to identify the receiving device and determine information on that device such as if that device is a MID, an 802.11 device or a Bluetooth device prior to determining the optimum connection path.

Presently, there is no convenient and efficient way to provide address correlation information to network devices containing a Bluetooth interface, for example, such that network performance may be optimized. Thus, there exists a need in the art for a method and system for managing device information such that optimum network characteristics or connection options would be effectively attainable.

SUMMARY

A method and apparatus is provided for managing network communication wherein corresponding addresses of network devices are maintained. When a first device in the network intends to communicate with a second device, the first device may send a first address of the second device to a network storage device and receive at least one second address of the second device from the network storage device, if a second address of the second device exists. The network devices may be but are not limited to Bluetooth devices or Multiple Interface Devices (MIDs). For example, the network devices may also be 802.11x devices, Home RF, GPRS (General Packet Radio Service), 3G devices, 2.5G devices, GSM (Global System for Mobile Communications) devices, EDGE (Enhanced Data for GSM Evolution) devices, TDMA type (Time Division Multiple Access) devices, or CDMA type (Code Division Multiple Access) devices, including CDMA2000 to name a few. Each network device may contain multiple addresses of varying types including but not limited to Bluetooth Device Address, Bluetooth Common Name, Bluetooth IP address, Bluetooth IP Common Name, 802.11 IP Address, 802.11 IP common Name, IEEE MAC address, for example. The network element may contain each address of each network element and may further provide a corresponding address to a network device based on the presentation of a first address such as a Bluetooth Device Address (BDA).

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written disclosure focus on disclosing example embodiments of this invention, it should be clearly understood that the same is by way of illustration and example only and the invention is not limited thereto. The spirit and scope of the present invention are limited only by the terms of the appended claims.

FIG. 4c is a flowchart illustrating an exemplary method of managing device address information in accordance with embodiments of the present invention.

DETAILED DESCRIPTION

Figure 1:
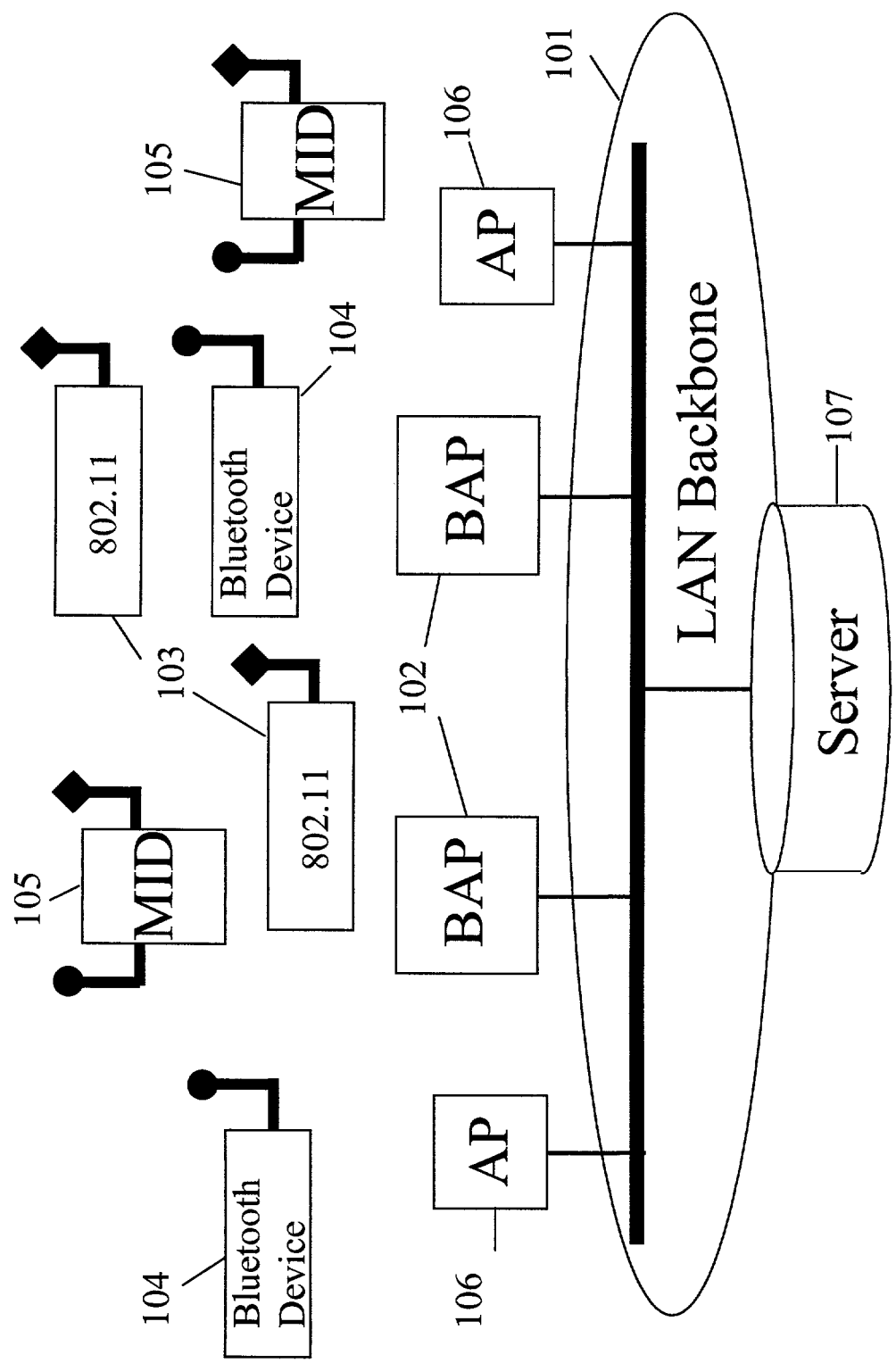
FIG. 1 illustrates an exemplary network including a network server in accordance with embodiments of the present invention.

Before beginning a detailed description of the invention, it should be noted that, when appropriate, like reference numerals and characters may be used to designate identical, corresponding or similar components in differing figure drawings. Further, in the detailed description to follow, example embodiments and values may be given, although the present invention is not limited thereto.

The present invention provides a device such a network storage device that integrates and manages network information in a plurality of wireless and/or wired technologies. Network devices in communication may include any wireless technology device including but not limited to Bluetooth devices, MID devices, 802.11x devices, Home RF, GPRS (General Packet Radio Service), 3G devices, 2.5G devices, GSM (Global System for Mobile Communications) devices, EDGE (Enhanced Data for GSM Evolution) devices, TDMA type (Time Division Multiple Access) devices, or CDMA type (Code Division Multiple Access) devices, including CDMA2000 to name a few. In addition, network devices may include any wired technology device such as but not limited to Ethernet (802.3), PSTN (Public Switched Telephone system), Cable Modem, DSL, etc. The network storage device may be but is not limited to a network server. For example, the network storage device may be a database, a linked list, linked table, array, hash tables, relational databases, matrices, HTTP Server, textual strings, bit representations or doubly-linked list to name a few.

Many types of devices and wired or wireless protocols may be used in the present invention. As a non-limiting example, 802.11 devices having IP addresses and IP names, Bluetooth devices (BDs) having a BDN (Bluetooth Device Name) and a unique BDA (Bluetooth Device Address), Multiple Interface Devices (MIDs) or any subcombination thereof, may participate in a communication network. MIDs contain more than one network interface, for example, MIDs may contain a Bluetooth interface and an 802.11 interface. In this situation, the Bluetooth interface of the MID may have a BDN and a BDA name, and the 802.11 interface of the MID may have an IP address and a common IP (network) name. A network storage device such as a server may contain and disseminate address and name information for each of the devices in the network. It should be appreciated that any wired or wireless device or technology may be accessed including Bluetooth, 802.11x, Home RF, GPRS (General Packet Radio Service), 3G, 2.5G, GSM (Global System for Mobile Communications), EDGE (Enhanced Data for GSM Evolution), TDMA type (Time Division Multiple Access), or CDMA type (Code Division Multiple Access), including CDMA2000.

In a first exemplary embodiment, a Bluetooth device may communicate directly with a second Bluetooth device through a baseband Bluetooth connection at Layer 2. Layer 2 refers to the second layer in a layering scheme such as the seven layer Open Systems Interconnection model (OSI). Using layering, functions are grouped within each layer according to what they are meant to accomplish. Layer 2 is the data link layer and is concerned with procedures and protocols for operating the communications lines, transmission of frames of data between devices. Layer 2 further covers protocols that are aimed at packaging raw data characters into frames, detecting and correcting errors when frames get lost or mutilated, arranging for re-transmission and adding flags and headers so that the Data Terminal Equipment (DTE) can recognize the beginning and end of a frame. In this first exemplary embodiment in which a Bluetooth device communicates directly with a second Bluetooth device through a baseband Bluetooth connection at Layer 2 via interfaces associated with each of the devices, the network backbone is not used and communication bypasses Bluetooth Access Points (BAPs) as all traffic flows in a point-to-point fashion between the two Bluetooth devices. This may be advantageous, for example, when traffic is high and the BAPs are heavily loaded. A Bluetooth device may have a Bluetooth Device Name (BDN), which is a common name for a Bluetooth device that is associated with a Bluetooth Device Address (BDA). If the Bluetooth device participates in an IP network, it may also have an IP address and an IP name in addition to the BDN and BDA. Alternatively, if other wired or wireless technologies and other wired or wireless devices are included in the communication network, addresses of the device corresponding to the wired or wireless technology is used.

Registration of devices may be accomplished through exchange of data packets. For example, in registration of addresses in a Bluetooth device, a first Bluetooth device may send an inquiry to a second Bluetooth device to exchange baseband Bluetooth packets. The inquiry may be in the form of an inquiry packet and the receiving Bluetooth device may return a response packet in response to receiving the inquiry packet. The response may be in the form of an inquiry_response packet containing a BDA of the second Bluetooth device. The first Bluetooth device is thereby informed of the BDA of the second Bluetooth device. The inquiry_response may further comprise a Bluetooth Common Name of the second Bluetooth device, the Bluetooth Common Name being a common language name associated with the Bluetooth device.

In order to communicate at the IP layer, IP addresses are necessary. There are many methods by which IP addresses are assigned such as, but not limited, to Dynamic Host configuration Protocol (DHCP), AutoIP, Point-to-Point Protocol (PPP) or manually. In addition, addresses may be factory-assigned, i.e., the addresses may be determined at the time of manufacture, for example.

MIDs may comprise at least 2 interfaces. The interfaces may comprise interfaces of any wireless technology including but not limited to, for example, Bluetooth, 802.11x, Home RF, GPRS (General Packet Radio Service), 3G, 2.5G, GSM (Global System for Mobile Communications), EDGE (Enhanced Data for GSM Evolution), TDMA type (Time Division Multiple Access), or CDMA type (Code Division Multiple Access), including CDMA2000. MIDs may also comprise an interface for any wired technology including but not limited to, for example, Ethernet (802.3), PSTN (Public Switched Telephone System), Cable Modem, or DSL. For example, a MID may comprise a Bluetooth Interface and an 802.11 interface. It is noted that MIDs are not so limited as any number of interfaces of any type may be used. Each of these interfaces has associated addresses for identification. The Bluetooth interface has the addresses as described above, namely, BDA, BDN, Bluetooth IP address and Bluetooth IP name. In this example, the 802.11 interface may have a Layer 2 address, IP address, and/or IP name. IP addresses may be configured by a variety of methods such as DHCP, AutoIP, PPP, manually, etc. for each interface. Layer 2 addresses may be factory-assigned, as explain above.

Furthermore, there may be more than one communication path with which devices in a network communicate. A network storage device such as a network server may contain address and name parameters of the network devices such that an originating device may query the server, for example, to obtain information on the intended device. It should be noted that any network storage device may be used without departing from the spirit and scope of the present invention. For example, the network storage device may be a database, linked table, array, hash table, relational database, matrix, HTTP server, doubly linked list, etc. The originating device may then determine the preferred communication path using the address and name parameters of the intended device, for example. In this way, the network storage device allows the devices to make intelligent or preferred choices regarding how they establish connections with other devices. For example, an originating device may use the network storage device to determine that connection to a MID device is possible via the 802.11 network to achieve a potentially higher transmission rate. In this case, connection via the network would be preferable if the higher transmission rate is desired, for example. Alternatively, if the Bluetooth Access Points (BAPs) are heavily loaded and there is a substantial traffic burden on the LAN backbone, it may be advantageous to allow traffic to flow in a point-to-point fashion between the two devices bypassing the network. In either case, the devices are able to make preferred choices.

FIG. 1 illustrates an exemplary network containing the network storage device of the present invention. In this non-limiting example, the network may contain a storage device such as a server 107 and a Local Area Network (LAN) backbone 101 to which any number of Bluetooth Access Points (BAPs) 102 and 802.11 Access Points (APs) 106 may be connected. As FIG. 1 illustrates, the exemplary network may further contain any number of Bluetooth Devices 104, 802.11x Devices 103 or Multiple Interface Devices (MIDs) 105.

Figure 2:
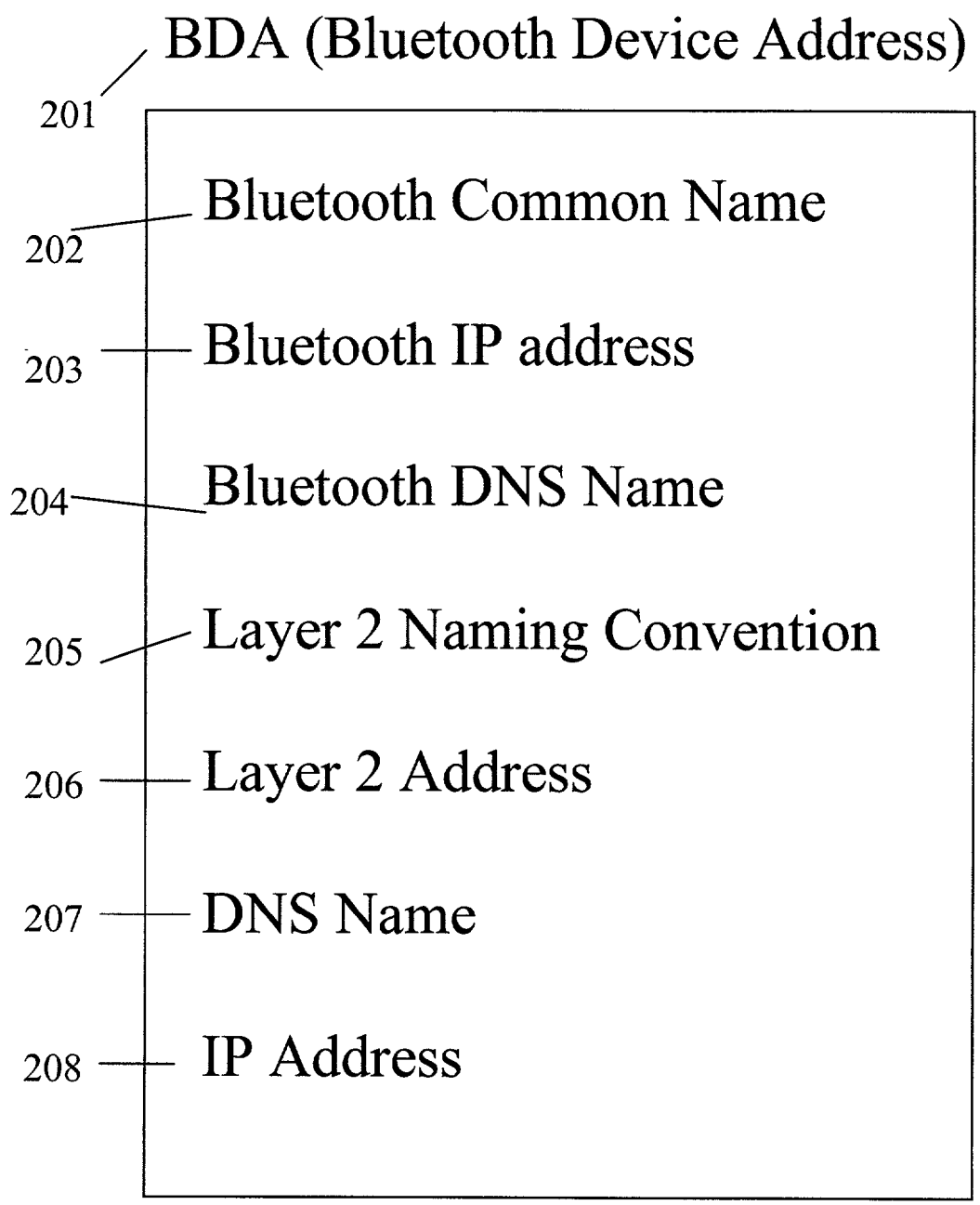
FIG. 2 illustrates an exemplary entry format in a server associated with a Bluetooth Device Address (BDA) in accordance with embodiments of the present invention.

FIG. 2 illustrates an exemplary entry format in the server associated with a Bluetooth Device Address (BDA) 201. The BDA 201 may be a 48-bit number represented by a series of 16 hexa-decimal digits grouped by twos, for example. The exemplary table as illustrated may be represented as a series of key-field pairs where the key describes what the field represents. It should be noted that the structure of the exemplary table may take a variety of forms and the structure depicted in FIG. 2 is merely an example for illustration purposes. For example, the storage means may comprise a linked table, array, hash table, relational database, matrix, HTTP server, doubly linked list, textual strings, bit representations, etc. In the example illustrated in FIG. 2, however, key-field pairs are used wherein the first three key-field pairs (202-204) represent a Bluetooth section wherein the first key in the table may be the Bluetooth Common Name 202. This may be a specific Bluetooth common name that may be a user-defined string of characters. The second key in the table as illustrated may be a Bluetooth IP address 203 which corresponds to the specific Bluetooth IP address. The third key may be the Bluetooth DNS name 204 (or "Bluetooth IP name") that may be the specific fully qualified domain name for the Bluetooth interface. It should be noted that a combination of Bluetooth Common Name 202, Bluetooth IP address 203 and Bluetooth DNS name 204 or any subcombination thereof may be used.

The next set of keys (205-208) in this example represent information associated with the non-Bluetooth interfaces and may be used when the device has additional interfaces. More than one additional interface may also be used in which case there may be additional sets of key information. For example, if more than two interfaces are used, the entry format may include additional fields such as a Number of Layer 2 Addresses field (not shown) and additional address and name fields corresponding to the additional interfaces. Alternatively, no additional interfaces are used. The Naming convention may allow devices to specify which type of Layer 2 device is utilized. For example, Ethernet or CDMA may be specified and the Layer 2 name is formatted to that particular Layer 2 naming convention 205. Layer 2 Addresses may provide a specific Layer 2 address 206 formatted according to a specific convention. The DNS Name 207 may be a fully qualified domain name and the IP Address may be a specific IP address associated with the interface. A Domain Name System (DNS) Protocol may be responsible for maintaining a mapping between the IP address 208 of an interface and the common IP network name of that interface. It should be noted that data storage may take a variety of forms. For example, address data may be contained in a linked list, linked tables, doubly-linked list or database. In a linked table structure, for example, one data entry in a table may reference a field in a second table that may provide additional data such as address information. A doubly-linked list structure may comprise a table containing fields that contain references or pointers to a second table that in turn contains data references or pointers to the first table. Alternatively, data may be contained in a single database, relational database, array, matrix, hash table, HTTP server, etc.

The network storage device enables network devices to make intelligent choices regarding how they establish connections to other devices. Network devices may query the network storage device to obtain information, such as information on interfaces on other devices.

Figure 3:
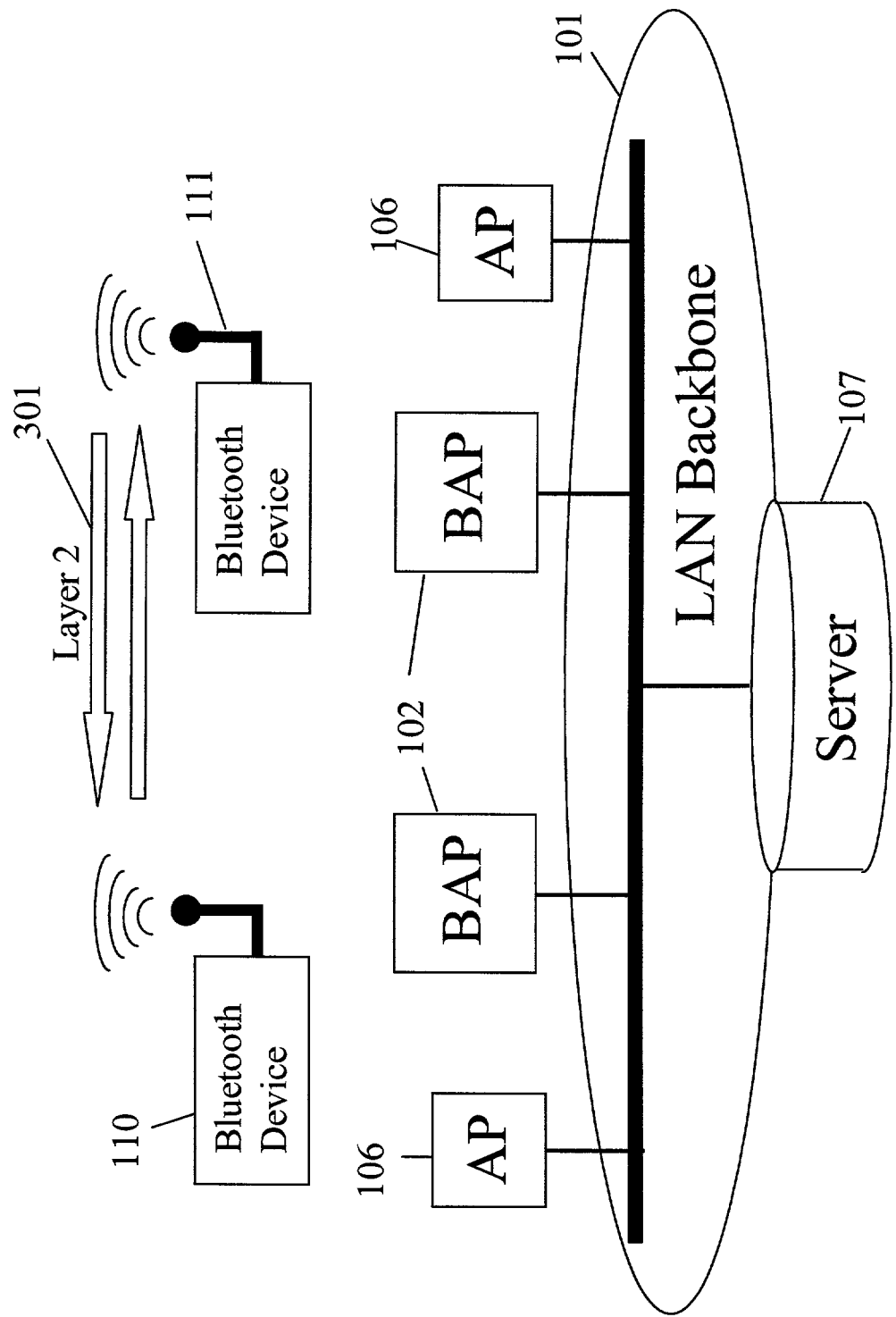
FIG. 3 is an illustrative embodiment of a communication between Bluetooth devices in accordance with embodiments of the present invention.

FIG. 3 is an illustrative embodiment of a communication between Bluetooth devices. It should be noted that this illustrative embodiment of the present invention of point-to-point connections between network devices is not limited to Bluetooth devices. For example, 802.11x devices in peer-to-peer mode may also be used in establishing a point-to-point connection between devices, however, Bluetooth devices may also establish a connection with other Bluetooth devices via the network infrastructure. In this example, two Bluetooth devices (110, 111) may establish a connection with each other in a point-to-point fashion. Name and address information are helpful in determining preferred connection modes for Bluetooth devices (110, 111). FIG. 3 illustrates an exemplary method whereby one Bluetooth device 110 is made aware of another Bluetooth device 111 in radio range by initiating a baseband Bluetooth connection at Layer 2 301 wherein a first device sends a data packet such as an inquiry packet to a second device (step 350) and receives a response data packet such as an inquiry_response packet from the second device (step 360). This inquiry_response packet contains the BDA of the responding Bluetooth device (i.e., the second device). In this way, Bluetooth devices (110, 111) within radio range of each other may know the BDA of other Bluetooth devices within range. If the Bluetooth devices (110, 111) connect through a baseband Bluetooth connection at Layer 2 301 as described, they do not connect through the LAN backbone 101 thus reducing the traffic burden on the LAN backbone 101. Further, traffic flows in a point-to-point fashion between the Bluetooth devices. Further, the network devices such as Bluetooth devices, may establish connections through the network backbone or may establish connections through the network backbone and hand off to the point-to-point connection via Layer 2 301 or may connect in a point-to-point fashion then convert to a connection via the network backbone. For example, a network device may initiate connection with a second network device by obtaining address information of the second network device from a network storage device such as a database, a doubly-linked data structure or a linked table structure. The address information may be returned to the first network device, which may determine that a connection with the second network device via the backbone would be advantageous because, for example, connecting via the backbone may provide a more stable connection or perhaps a more secure connection. In contrast, a direct point-to-point connection may result in a faster connection as well as conserving on bandwidth use in the network. Devices may also alternate in the mode of connection either via the network backbone or via a direct point-to-point connection depending on current needs. In any event, a preferred mode of connection may be made between network devices depending on the needs of the system or devices.

FIGS. 4a, 4b, 4c, and 4d illustrate another exemplary embodiment of communication between Bluetooth devices (110, 111). It should be noted that the present invention is not limited to Bluetooth Devices. For example, 802.11x devices in peer-to-peer mode may also establish point-to-point connections with network devices. Further, a variety of wired or wireless devices may be used to establish a connection via a network infrastructure or LAN backbone with other network devices, the wired devices including but not limited to Ethernet (802.3), PSTN (Public Switch Telephone System), Cable Modem or DSL and the wireless devices including but not limited to 802.11x devices, Home RF, GPRS (General Packet Radio Service), 3G devices, 2.5G devices, GSM (Global System for Mobile Communications) devices, EDGE (Enhanced Data for GSM Evolution) devices, TDMA type (Time Division Multiple Access) devices, or CDMA type (Code Division Multiple Access) devices, including CDMA2000 to name a few. Bluetooth Devices provide the added advantage of being able to communicate between devices in both a point-to-point fashion and via a network infrastructure. In this example, Bluetooth devices are illustrated wherein each Bluetooth device (110, 111) may establish an IP connection to the LAN backbone 101 through a Bluetooth Access Point (BAP) 102. By utilizing an IP connection through a BAP 102 to the LAN backbone 101, radio power may be minimized if the devices are closer to their respective BAPs 102 than to each other. Further, quality of service (QoS) mechanisms present on the LAN backbone 101 may be used. This process is facilitated if the IP address or IP name that is associated with the Bluetooth interface of the desired recipient is known by the originating device.

Figure 4A:
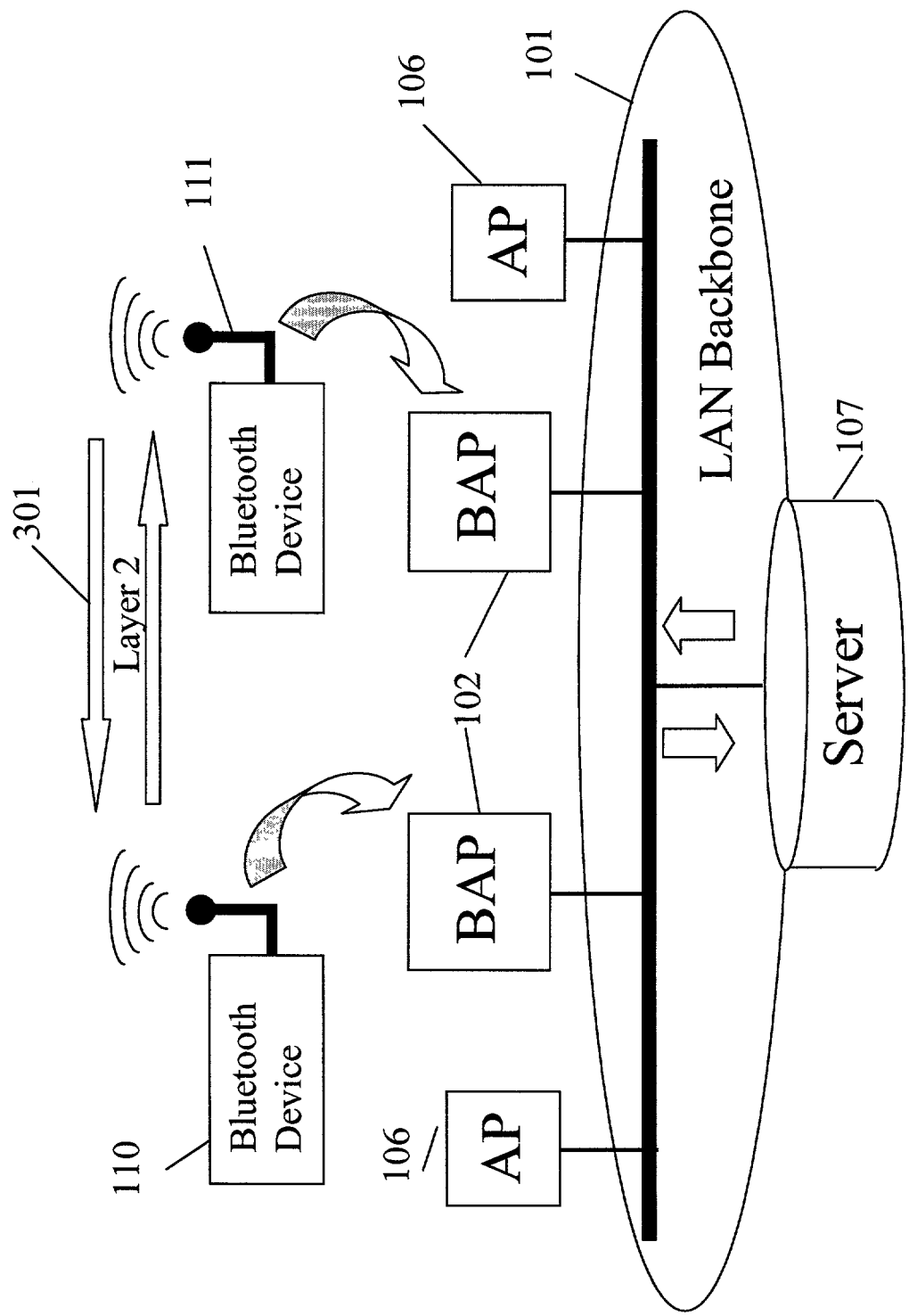
FIG. 4a is another illustrative embodiment of a communication between Bluetooth devices in accordance with embodiments of the present invention.
Figure 4B:
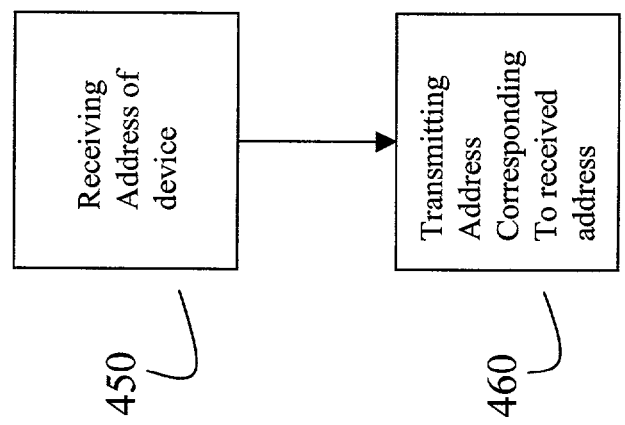
FIG. 4b is a flowchart illustrating an exemplary method of managing device address information in accordance with embodiments of the present invention.
Figure 4D:
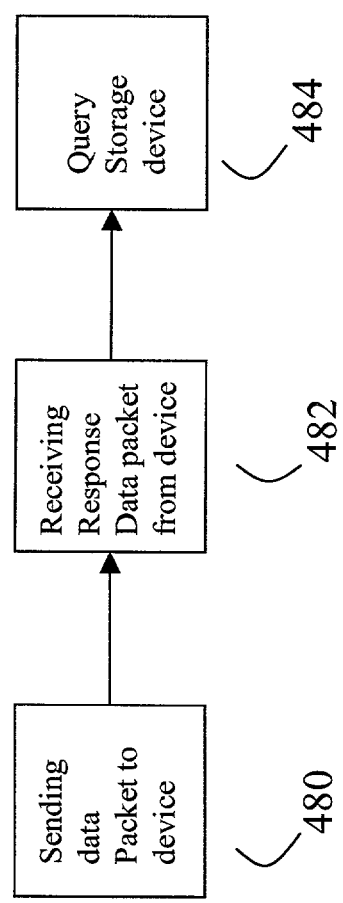
FIG. 4d is a flowchart illustrating an exemplary method of managing device address information in accordance with embodiments of the present invention.

During the communication of Bluetooth Devices (110, 111) through a baseband Bluetooth connection at Layer 2 301, each Bluetooth device (110, 111) may receive the BDAs of Bluetooth devices within range. In FIG. 4d, for example, a first Bluetooth device 110 may send a data packet such as an inquiry packet to a second Bluetooth device 111 (step 480) and receive a response data packet such as an inquiry_response packet from the second Bluetooth device 111 (step 482), however, each Bluetooth device (110, 111) may not receive the IP address or IP name of a desired neighboring Bluetooth device. To obtain this information, an originating Bluetooth device 110 may query the server 107 in the LAN backbone 101 (step 484). In a further aspect of this example, which is illustrated in FIGS. 4b and 4c, the originating Bluetooth device 110 provides the BDA of the Bluetooth device 111 it intends to transfer information with to the network storage device such as the server 107 (FIG. 4c, step 465). The server 107 may receive the BDA (FIG. 4b, step 450) and may return the IP address and IP name of the device corresponding to the provided BDA (FIG. 4b, step 460). Thus, having obtained the IP address and IP name of the desired Bluetooth device 111 (FIG. 4c, step 470), the originating Bluetooth device 110 may connect to the desired Bluetooth device 111 (FIG. 4c, step 475) through the IP network of the LAN backbone 101 or may determine that connecting through a baseband Bluetooth connection at Layer 2 301 is preferable, such as in the case of high traffic flow and traffic burden on the LAN backbone and the desirability of achieving traffic flow in a point-to-point fashion between devices.

Figure 5A:
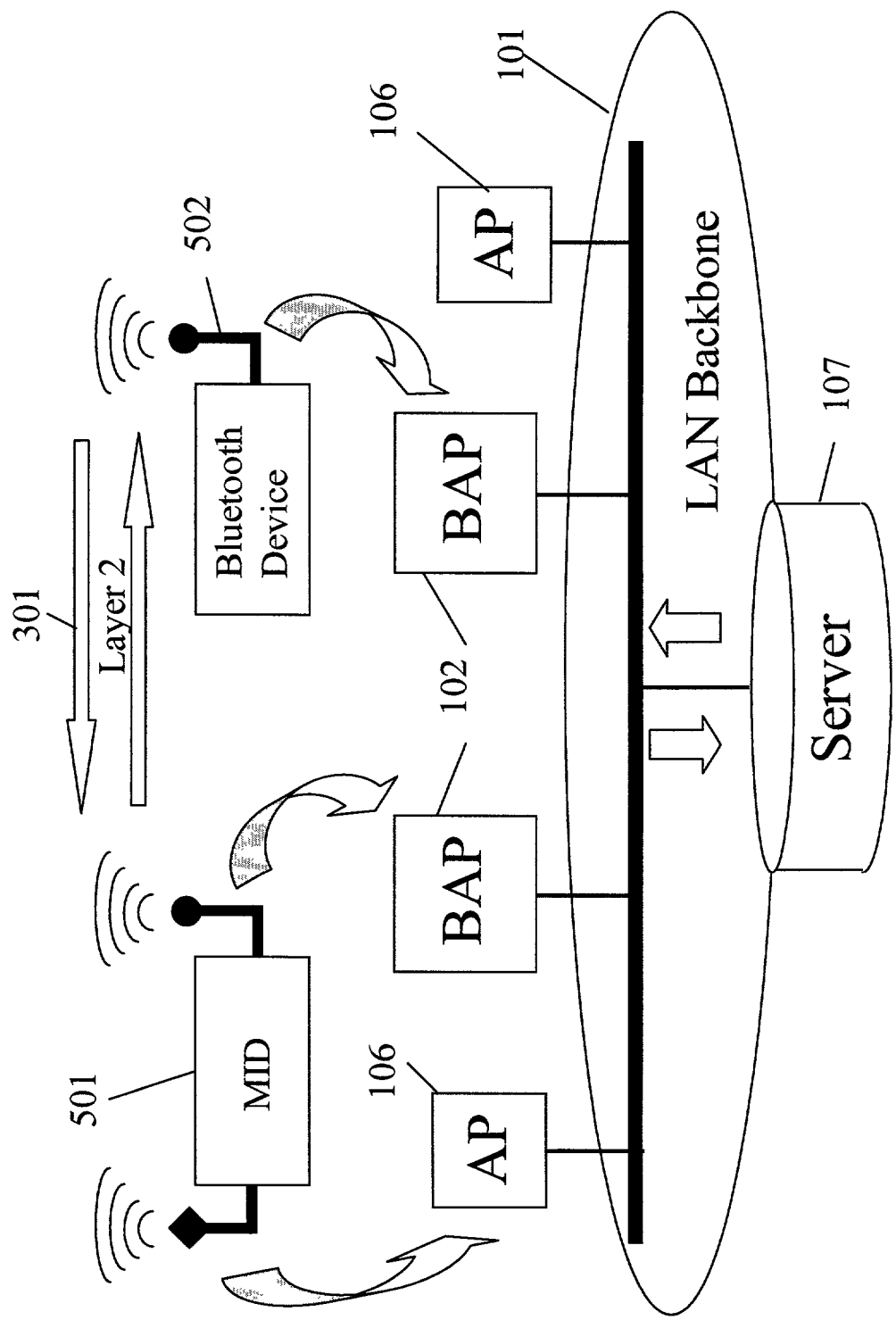
FIG. 5a is an illustrative embodiment of communication between a Bluetooth Device and a Multiple Interface Device (MID) in accordance with embodiments of the present invention.
Figure 5B:
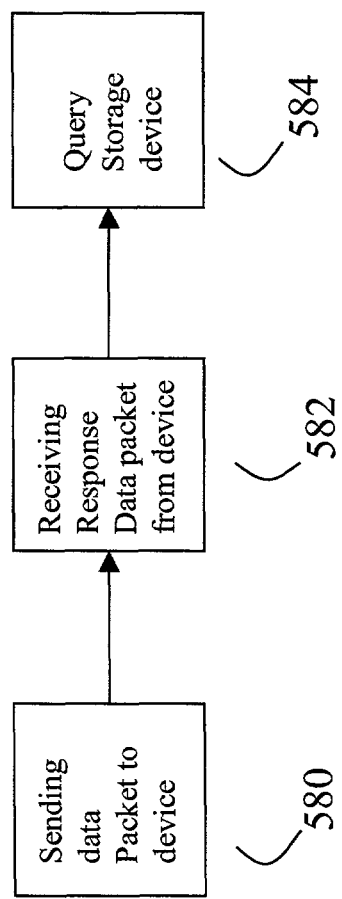
FIG. 5b is a flowchart illustrating an exemplary method of managing device address information in accordance with embodiments of the present invention.
Figure 5C:
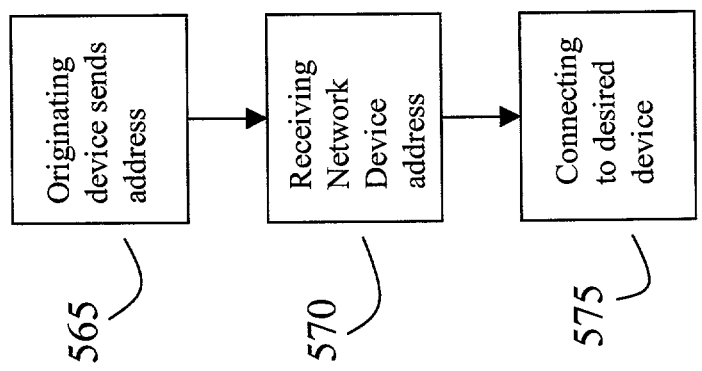
FIG. 5c is a flowchart illustrating an exemplary method of managing device address information in accordance with embodiments of the present invention.

FIGS. 5a, 5b and 5c are illustrative embodiments of communication between a Bluetooth Device 502 and a Multiple Interface Device (MID) 501. It should be noted that the present invention is not limited to Bluetooth Device interfaces as any variety of wireless devices may be used. The MID 501 may comprise interfaces corresponding to any variety of wired or wireless devices including but not limited wired devices such as Ethernet (802.3), PSTN, Cable Modem, or DSL, for example or wireless devices such as 802.11x devices, Home RF, GPRS (General Packet Radio Service), 3G devices, 2.5G devices, GSM (Global System for Mobile Communications) devices, EDGE (Enhanced Data for GSM Evolution) devices, TDMA type (Time Division Multiple Access) devices, or CDMA type (Code Division Multiple Access) devices, including CDMA2000 to name a few. As illustrated, a Bluetooth device 502 may establish a connection with a MID 501 in a variety of ways and name and address information is helpful in determining the optimal connection. In this example, the MID device contains a Bluetooth interface and an 802.11 interface, though in principle this invention is not limited to MIDs of this particular type, and is applicable to any MID containing at least one Bluetooth interface and any number of IP interfaces, both wired and wireless. In this example, the Bluetooth device 502 is made aware of a MID 501 in radio range by initiating a baseband Bluetooth connection at Layer 2 301, sending an inquiry packet to and receiving an inquiry_response packet from the Bluetooth interface of the MID 501. This inquiry_response packet contains the BDA of the responding MID 501. In this way, Bluetooth devices 502 may know the BDA of MIDs 501 within range. If the Bluetooth device 502 connects through a baseband Bluetooth connection at Layer 2 301 as described with a MID 501, they do not connect through the LAN backbone 101 thus reducing the traffic burden on the LAN backbone 101. Further, traffic flows in a point-to-point fashion between the Bluetooth device 502 and the MID 501. Conversely, a MID 501 may establish a connection with a Bluetooth device 502 such that the MID 501 may initiate, a baseband Bluetooth connection at Layer 2 301 through a Bluetooth interface, for example, by sending an inquiry packet to and receiving an inquiry_response packet from the Bluetooth device 502. This inquiry_response packet contains the BDA of the responding Bluetooth device 502 such that the MID 501 may know the BDA of Bluetooth devices 502 within range.

If a Bluetooth device 502 is the originating device, the Bluetooth device 502 may also establish an IP connection to the LAN backbone 101 through a Bluetooth Access Point (BAP) 102. By utilizing an IP connection through a BAP 102 to the LAN backbone 101, radio power may be minimized if the devices are closer to their respective BAPs 102 than to each other. Further, QoS mechanisms present on the LAN backbone 101 may be used. The process is facilitated if the IP address or IP name that is associated with the Bluetooth interface of the MID 501 is known by the originating Bluetooth device 502.

Figure 5D:
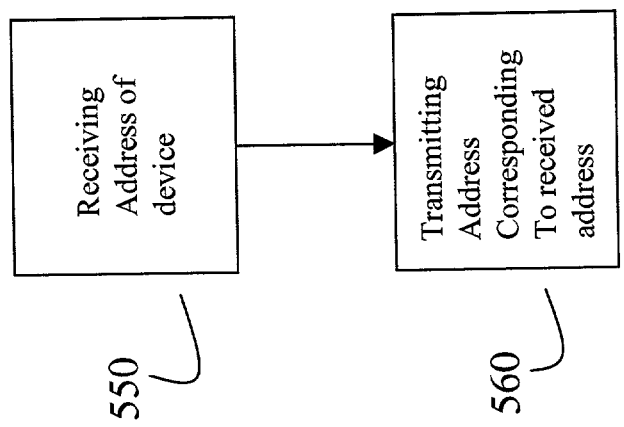
FIG. 5d is a flowchart illustrating an exemplary method of managing device address information in accordance with embodiments of the present invention.

The devices may exchange BDAs through communication through a baseband Bluetooth connection at Layer 2 301. FIG. 5b illustrates an exemplary method. In this example, a first device sends a data packet (e.g., an inquiry packet) to a second device (step 580) and receives a response data packet (e.g., an inquiry_response packet) from the second device (step 582) and may obtain IP address or IP name information by querying the server in the LAN backbone 101 as described (step 584). FIGS. 5c and 5d illustrate a further aspect of this example wherein the originating Bluetooth device 502 provides the BDA of the Bluetooth interface of the MID 501 it intends to transfer information with (FIG. 5c, step 565) to the server 107 (FIG. 5d, step 550). The server 107 may receive the BDA and may return the IP address and IP name of the device corresponding to the provided BDA, associated with the Bluetooth interface resident on the MID, as well as an IP address and IP name associated with the 802.11 interface or an 802.11 MAC address (FIG. 5d, step 560) to the originating Bluetooth device 502 (FIG. 5c, step 570). Thus, having obtained name and address information for the desired MID 501, the originating Bluetooth device 502 may connect through the Bluetooth interface of the MID 501 through the BAP 102 and IP network of the LAN backbone 101 or may choose to send IP packets to the 802.11 interface of the MID 501 by addressing packets to the IP address or IP name associated with the 802.11 interface of the MID 501 it is corresponding with, or may determine that connecting through a baseband Bluetooth connection at Layer 2 301 to the Bluetooth interface of the MID 501 is preferable (step 575).

If the originating device is a MID 501, the MID 501 may choose an additional option to connect through its 802.11 interface using an 802.11 Access Point (AP) 106 to communicate with the Bluetooth device 502.

Figure 6:
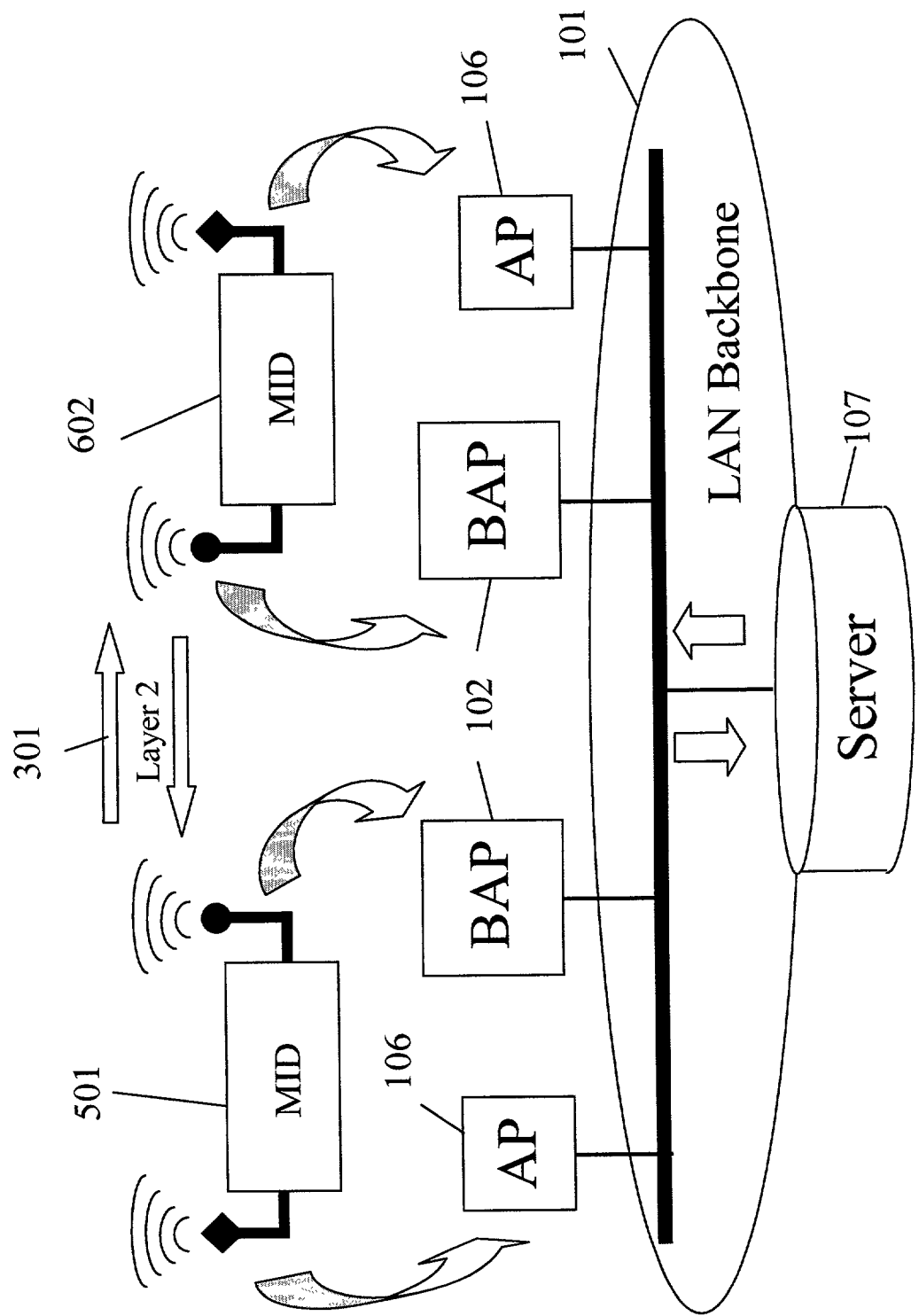
FIG. 6 is an illustrative embodiment of communication between two MID devices in accordance with embodiments of the present invention.

FIG. 6 is an illustrative embodiment of communication between two MID devices (501, 602). The originating MID 501 has a variety of connection options including but not limited to, for example, Bluetooth, 802.11x, Home RF, GPRS (General Packet Radio Service), 3G, 2.5G, GSM (Global System for Mobile Communications), EDGE (Enhanced Data for GSM Evolution), TDMA type (Time Division Multiple Access), CDMA type (Code Division Multiple Access), including CDMA2000, Ethernet (802.3), PSTN, Cable Modem, or DSL to name a few. Bluetooth devices interfaces provide the advantage of enabling communication between devices in a point-to-point fashion and via the network infrastructure. In the present example, however, the MID devices may communicate through a baseband Bluetooth connection at Layer 2 301 through their Bluetooth interfaces, the originating MID 501 may direct IP packets out of its 802.11 interface to the 802.11 interface of the corresponding MID 602 using the IP address and/or IP name of the 802.11 interface of the corresponding device 602 provided by the server 105, the originating MID 501 may direct IP packets out of its 802.11 interface to the Bluetooth interface of the corresponding MID 602 using the IP address and/or IP name of the Bluetooth interface of the corresponding device 602 provided by the server 107, the originating MID 501 may direct packets out of its Bluetooth interface to the 802.11 interface of the corresponding MID 602 using the IP address and/or IP name of the 802.11 interface of the corresponding device 602 provided by the server 107, and the originating MID 501 may direct IP packets out of its Bluetooth interface to the Bluetooth interface of the corresponding MID 602 using the IP address and/or IP name of the Bluetooth interface of the corresponding device provided by the server.

It is understood that the present invention can take many forms and embodiments. The embodiments shown herein are intended to illustrate rather than to limit the invention, it being appreciated that variations may be made without departing from the spirit of the scope of the invention. Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

What is claimed is:

1. A method of managing network communications between a first network device, a second network device, the second network device having a first network address and a second network address, and a network storage entity that stores the first network address and the second network address of the second network device, said method comprising:

receiving at the network storage entity, from said first network device, said first address of said second network device; and transmitting from said network storage entity at least said second address of said second network device to the first network device, wherein the first network device includes a first Bluetooth device, the second network device includes a second Bluetooth device and the first address includes a Bluetooth Device Address (BDA) associated with the second network device.

2. The method of claim 1, wherein the at least one second address corresponding to the second network device comprises at least one of an IP address corresponding to the second network device or an IP name corresponding to the second network device.

3. The method of claim 1, wherein said receiving is performed via a Bluetooth Access Point (BAP).

4. The method of claim 1, wherein the first network device includes a Bluetooth device, and the second network device includes a Multiple Interface Device (MID), wherein the MID includes a first interface and a second interface.

5. The method of claim 4, wherein the at least one second address comprises at least one of an internet protocol (IP) address corresponding to the second network device or an IP name corresponding to the second network device.

6. The method of claim 4, wherein the first interface is a Bluetooth interface and the second interface is an 802.11 interface.

7. The method of claim 6, wherein the at least one second address comprises at least one of an IP address of the Bluetooth interface of the MID, an IP name of the Bluetooth interface of the MID, an IP address of the 802.11 interface of the MID, or an IP name of the 802.11 interface of the MID.

8. The method of claim 6, wherein said receiving is performed via a Bluetooth Access Point (BAP).

9. The method of claim 1, wherein the first network device includes a Multiple Interface Device (MID), the second network device includes a Bluetooth device and the first address includes a Bluetooth Device Address (BDA) corresponding to the second network device, and wherein the MID includes a first interface and a second interface.

10. The method of claim 9, wherein the at least one second address comprises at least one of an IP address corresponding the second network device or an IP name corresponding to the second network device.

11. The method of claim 9, wherein the first interface includes a Bluetooth interface and the second interface includes an 802.11 interface.

12. The method of claim 11, wherein said receiving is performed via a Bluetooth Access Point (BAP).

13. The method of claim 11, wherein said receiving is performed via an 802.11 Access Point (AP).

14. A network, comprising:
at least one network device including a first network interface and a second network interface;
a storage device including at least one record having identifying information for said at least one network device, said at least one record specifying identification information for said first network interface and said second network interface, wherein said identification information is accessed by at least a second network device; and
a first access point device connectable to said storage device and connectable to said at least one network device through said first network interface;
a second access point device connectable to said storage device and connectable to said at least one network device through said second network interface,
wherein said access point device communicates with said at least one network device.

15. The network of claim 14, wherein the network interface is a Bluetooth interface.

16. The network of claim 14, wherein the access point device is a Bluetooth Access Point (BAP).

17. The network of claim 14, wherein said at least one network device further comprises an 802.11 interface.

18. The network of claim 17, further comprising an 802.11 Access Point (AP), wherein said AP communicates with said at least one network device.

19. A computer readable medium having computer-executable instructions stored thereon, said instructions relating to a program for performing steps that manage network communication between a first network device, a second network device, the second network device having a first network address and a second network address, and a network storage entity that stores the first network address and the second network address of the second network device, said steps comprising:
receiving at the network storage entity, from said first network device, said first address of said second network device; and,
transmitting from said network storage entity at least said second address of said second network device to the first network device,
wherein the first network device includes a first Bluetooth device, the second network device includes a second Bluetooth device and the first address includes a Bluetooth Device Address (BDA) associated with the second network device.

20. The computer readable medium of claim 19, wherein the at least one second address corresponding to the second network device comprises at least one of an IP address corresponding to the second network device or an IP name corresponding to the second network device.

21. The computer readable medium of claim 19, wherein said receiving is performed via a Bluetooth Access Point (BAP).

22. The computer readable medium of claim 19, wherein the first network device includes a Bluetooth device, and the second network device includes a Multiple Interface Device (MID), wherein the MID includes a first interface and a second interface.

23. The computer readable medium of claim 22, wherein the at least one second address comprises at least one of an internet protocol (IP) address corresponding to the second network device or an IP name corresponding to the second network device.

24. The computer readable medium of claim 22, wherein the first interface is a Bluetooth interface and the second interface is an 802.11 interface.

25. The computer readable medium of claim 24, wherein the at least one second address comprises at least one of an IP address of the Bluetooth interface of the MID, an IP name of the Bluetooth interface of the MID, an IP address of the 802.11 interface of the MID, or an IP name of the 802.11 interface of the MID.

26. The computer readable medium of claim 24, wherein said receiving is performed via a Bluetooth Access Point (BAP).

27. The computer readable medium of claim 19, wherein the first network device includes a Multiple Interface Device (MID), the second network device includes a Bluetooth device and the first address includes a Bluetooth Device Address (BDA) corresponding to the second network device, and wherein the MID includes a first interface and a second interface.

28. The computer readable medium of claim 27, wherein the at least one second address comprises at least one of an IP address corresponding the second network device or an IP name corresponding to the second network device.

29. The computer readable medium of claim 27, wherein the first interface includes a Bluetooth interface and the second interface includes an 802.11 interface.

30. The computer readable medium of claim 29, wherein said receiving is performed via a Bluetooth Access Point (BAP).

31. The computer readable medium of claim 29, wherein said receiving is performed via an 802.11 Access Point (AP).

32. The computer readable medium of claim 19, wherein the first network device is a first Multiple Interface Device (MID) including a first interface and a second interface, the second network device includes a second Multiple Interface Device (MID) including a third interface and a fourth interface, and wherein further the first address includes a BDA corresponding to the second MID.

33. The computer readable medium of claim 32, wherein the at least one second address comprises at least one of an IP address corresponding to the second network device or an IP name corresponding to the second network device.

34. The computer readable medium of claim 32, wherein the first interface and the third interface include Bluetooth interfaces and wherein further the second interface and the fourth interface include 802.11 interfaces.

35. The computer readable medium of claim 32, wherein said receiving is performed via a Bluetooth Access Point (BAP).

36. The computer readable medium of claim 32, wherein said receiving is performed via an 802.11 Access Point (AP).

* * * * *

UNITED STATES PATENT AND TRADEMARK OFFICE
CERTIFICATE OF CORRECTION

PATENT NO.        : 8,554,915 B2                                     Page 1 of 1
APPLICATION NO.   : 10/144717
DATED             : October 8, 2013
INVENTOR(S)       : Famolari et al.

It is certified that error appears in the above-identified patent and that said Letters Patent is hereby corrected as shown below:

In the Specification

In Column 7, Line 38, delete "Switch" and insert -- Switched --, therefor.

In Column 8, Line 60, delete "initiate," and insert -- initiate --, therefor.

In Column 9, Lines 64-65, delete "server 105," and insert -- server 107, --, therefor.

Signed and Sealed this
Seventh Day of April, 2015

Michelle K. Lee
*Director of the United States Patent and Trademark Office*